United States Patent [19]

Izawa et al.

[11] Patent Number: 4,803,350
[45] Date of Patent: Feb. 7, 1989

[54] NON-CONTACT READING TYPE IC CARD WITH PRE-ENHANCEMENT FUNCTION

[75] Inventors: Fumio Izawa, Sagamihara; Masayuki Shinozaki, Yokohama, both of Japan

[73] Assignee: Kabushiki Kaisha Toshiba, Kawasaki, Japan

[21] Appl. No.: 149,592

[22] Filed: Jan. 28, 1988

[30] Foreign Application Priority Data

Feb. 3, 1987 [JP] Japan .................................. 62-21697

[51] Int. Cl.⁴ ............................................ G06K 19/06
[52] U.S. Cl. ...................................... 235/492; 235/487
[58] Field of Search ................................ 235/487, 492

[56] References Cited

U.S. PATENT DOCUMENTS 4,298,793  11/1981  Melis .................................... 235/492

FOREIGN PATENT DOCUMENTS 57-52620  11/1982  Japan .

Primary Examiner—Harold I. Pitts
Attorney, Agent, or Firm—Cushman, Darby & Cushman

[57] ABSTRACT

An IC element is incorporated in a card substrate, and includes at least a memory in which data can be stored and from which it can be read out. A pre-processing section is incorporated in the card substrate, to receive an output from the IC element. The pre-processing section pre-enhances readout data from the memory of the IC element, so as to substantially attenuate high-frequency components of the data. A transducer is incorporated in the card substrate to receive an output from the pre-processing section. The transducer generates a magnetic field corresponding to the data read out from the memory of the IC element and supplied via the pre-processing section.

20 Claims, 5 Drawing Sheets

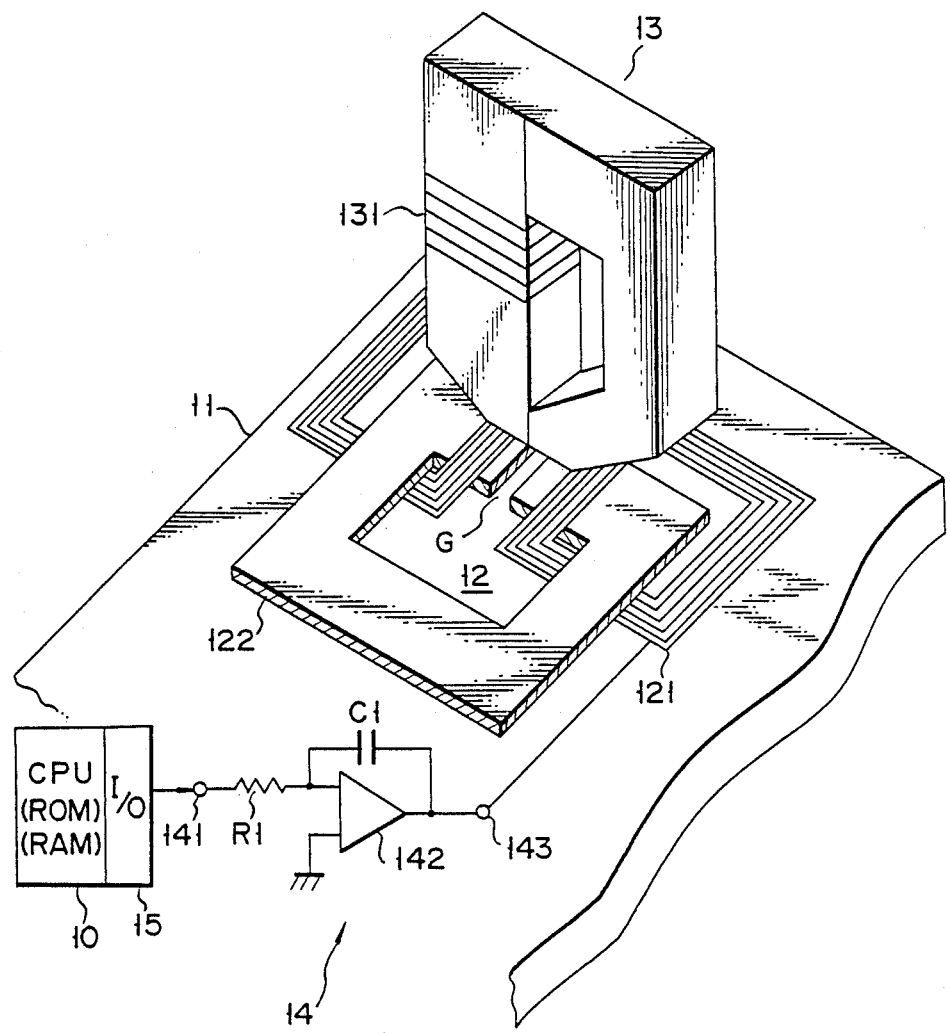
F I G. 1

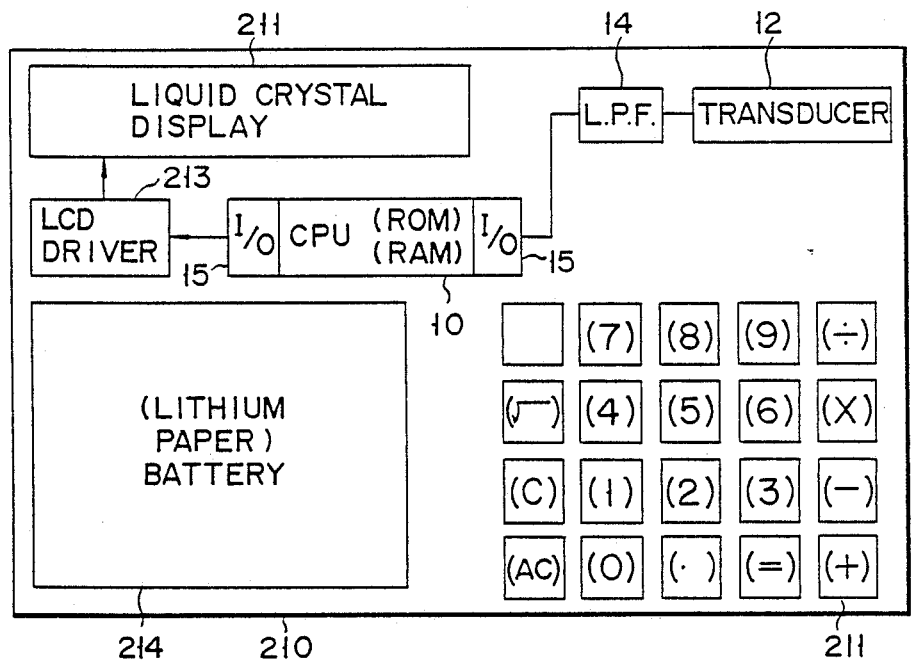
F I G. 4
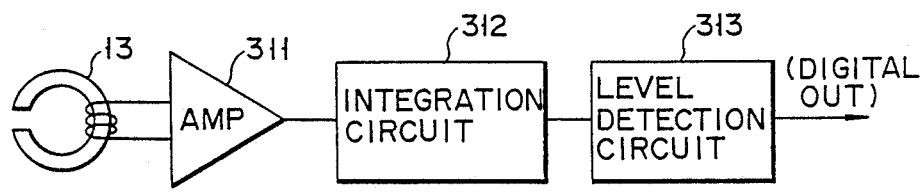
F I G. 5

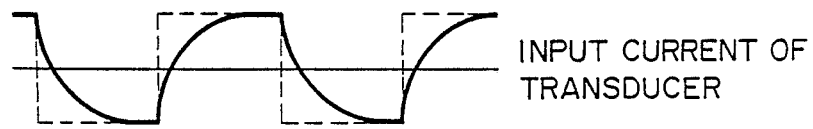
INPUT CURRENT OF TRANSDUCER
F I G. 6A
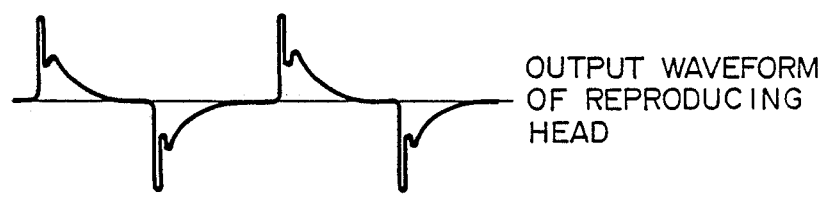
OUTPUT WAVEFORM OF REPRODUCING HEAD
F I G. 6B
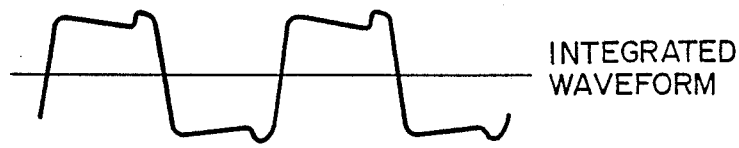
INTEGRATED WAVEFORM
F I G. 6C
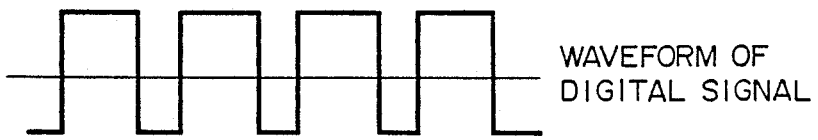
WAVEFORM OF DIGITAL SIGNAL
F I G. 6D

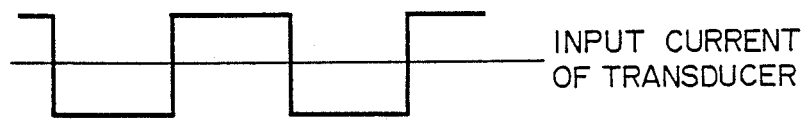
FIG. 7A — INPUT CURRENT OF TRANSDUCER
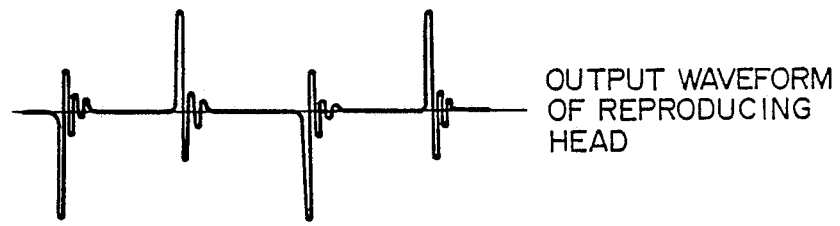
FIG. 7B — OUTPUT WAVEFORM OF REPRODUCING HEAD
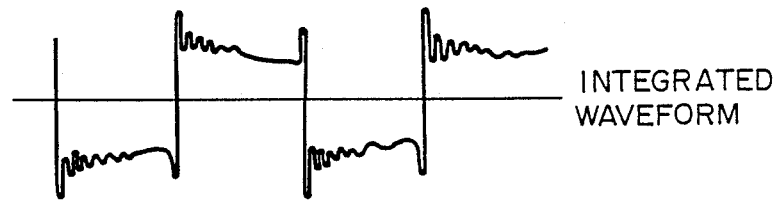
FIG. 7C — INTEGRATED WAVEFORM
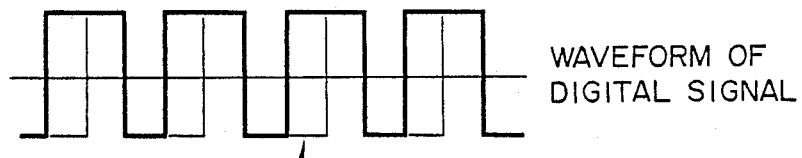
FIG. 7D — WAVEFORM OF DIGITAL SIGNAL / ERROR WAVEFORM

NON-CONTACT READING TYPE IC CARD WITH PRE-ENHANCEMENT FUNCTION

BACKGROUND OF THE INVENTION

The present invention relates to a non-contact reading type IC card with a pre-enhancement function and, more particularly, to an IC card in which the signal transfer characteristic between the IC card and an external reading unit is improved.

A card-like medium (IC card) has recently been developed which incorporates an IC (integrated circuit) having a large storage capacity. Efforts have been made to put such a medium into practical use in various data managements for transactions and the like. In order to perform a signal transfer between the IC card and the external reading unit, a non-contact type IC card of a magnetic coupling system has been developed in place of a conventional contact type IC card of an electrical contact system.

The contact type IC card poses a problem of reliability whereas the non-contact type IC card of the magnetic coupling system has improved reliability. In addition, according to the non-contact type IC card, a reading unit for the conventional IC card which is widely used at present can be utilized without any modification.

According to this magnetic coupling system, a thin film magnetic head, i.e., a transducer including a coil for generating a magnetic field is formed on an insulating card-like substrate incorporating an IC, and a pulse signal (information) is supplied from an output port in the IC card to the coil of the transducer. As a result, a magnetic field corresponding to the signal is generated in the coil or in a magnetic gap of the transducer. On the other hand, in a reading unit for reading internal information output from the IC card, a magnetic head of the reading unit is positioned near the coil or a core gap portion of the transducer of the IC card to detect changes in the magnetic field generated at the transducer of the IC card. With this arrangement, changes in current induced by the coil of the magnetic head of the reading unit correspond to signals output from the IC card.

However, according to the signal transfer system of the IC card system described above, the following problem is posed. When a pulse signal having a rectangular waveform shown in FIG. 3A is output from the IC card side, the magnetic head of the reading unit may output a pulse having ringing components at its leading and trailing edges, as shown in FIG. 3B. For this reason, data processing performed by shaping such a waveform is hindered. The reason for this may be as follows. In the reading unit used together with the conventional magnetic card, a frequency characteristic of an amplifier for amplifying a signal output from the IC card after the output signal is detected by a magnetic head is not flat in a high-frequency range. Since the reading unit including such an amplifier having a non-flat high-frequency range characteristic is presently used for reading output data from the IC card, some countermeasures must be taken on the IC card side.

SUMMARY OF THE INVENTION

It is therefore an object of the present invention to provide a new and improved non-contact reading type IC card with a pre-enhancement function which allows a reading unit of a type used together with a magnetic card to perform more reliable data read processing of an IC card.

It is another object of the present invention to provide an IC card having an intelligent function in addition to the pre-enhancement function.

According to one aspect of the present invention, there is provided an IC card comprising:

a card substrate;

an IC element incorporated in the card substrate, the IC element including at least a memory in which data can be stored and from which data can be read out;

pre-processing means, incorporated in the card substrate, for receiving an output from the IC element, the pre-processing means pre-enhancing readout data from the memory of the IC element to substantially attenuate a high-frequency component; and transducer means, incorporated in the card substrate, for receiving an output from the preprocessing means, the transducer means generating a magnetic field corresponding to the readout data supplied from the memory of the IC element through the pre-processing means.

BRIEF DESCRIPTION OF THE DRAWINGS

These and other objects and features of the present invention can be understood through the following embodiments by reference to the accompanying drawings, in which:

FIG. 1 is a view illustrating an arrangement of an IC card according to an embodiment of the present invention;

FIG. 4 is a view illustrating an arrangement of an IC card according to another embodiment of the present invention;

FIG. 5 is a circuit diagram of a reading unit used for reading data from the IC card in FIGS. 1 or 4; and FIGS. 6A to 6D and FIGS. 7A to 7D are views showing waveforms at corresponding parts when the IC card in FIG. 1 or 4 according to the present invention and the conventional IC card are read by the reading unit in FIG. 5.

DETAILED DESCRIPTION OF THE PREFERRED EMBODIMENTS

Figure 2A:
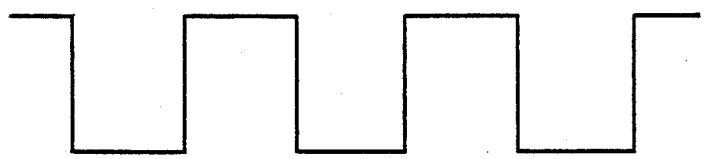
FIGS. 2A to 2C show signal waveforms for explaining an operation of the IC card in FIG. 1.

Preferred embodiments of the present invention will now be described with reference to the accompanying drawings.

FIG. 1 shows a first embodiment of the present invention. IC card substrate 11 incorporates memories (ROM, RAM) for data storage, and IC 10 constituted by an integrated operation/control circuit (CPU). In order to cause an external reading unit to read out output data from IC 10, the output data is supplied to thin film coil 121 of transducer 12 incorporated in IC card substrate 11 through low-pass filter 14 to be described later. Transducer 12 has a structure of a so-called magnetic coupling system. That is, thin film magnetic core 122 having gap portion G is formed on IC card substrate 11, and thin film coil 121 is flatly wound around thin film magnetic core 122. When the output data from IC 10 is supplied to thin film coil 121 as an input signal, a magnetic field corresponding to the input signal is generated at gap portion G.

Referring to FIG. 1, reference numeral 13 denotes a magnetic read head in the reading unit (not shown). Magnetic read head 13 is positioned near gap portion G when IC card substrate 11 is inserted. Magnetic read head 13 is magnetically coupled to transducer 12 formed on IC card substrate 11. With this arrangement, an output corresponding to the signal supplied to transducer 12 can be obtained at coil 131 of magnetic read head 13.

Figure 2B:
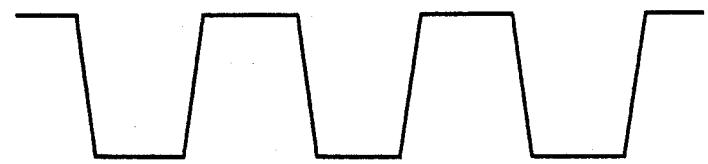

In the present invention, low-pass filter 14 is incorporated in IC card substrate 11 to pre-process an output from IC 10, which will be supplied to transducer 12 as an input signal. More specifically, output data from input/output circuit (I/O) 15 coupled to IC 10 is supplied to input terminal 141 of low-pass filter 14 and input to one input terminal of differential amplifier 142 through resistor R1. A reference (ground) potential is applied to the other input terminal of differential amplifier 142. Output terminal 143 is connected to the lead line of thin film coil 121, and is also feedback-connected to one input terminal of differential amplifier 142 through capacitor C1. Therefore, low-pass filter 14 functions as an integration circuit. When a signal having a rectangular waveform shown in FIG. 2A is supplied to input terminal 141, a signal having ramps at the leading and trailing edges (FIG. 2B) can be obtained at its output terminal. If the signal pre-enhanced in this manner is supplied to transducer 12 and read by magnetic read head 13, coil 131 outputs a signal shown in FIG. 2C. This output does not include ringing components as in the conventional system. Therefore, even if a reading unit, which is used together with a magnetic card including an amplifier having a non-flat high-frequency characteristic, is utilized for reading an IC card, data can be read from the IC card without an error, thereby realizing more reliable data processing.

Figure 2C:
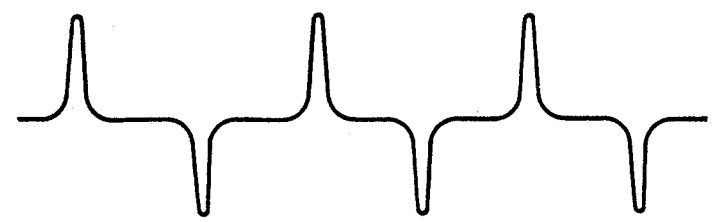
Figure 3A:
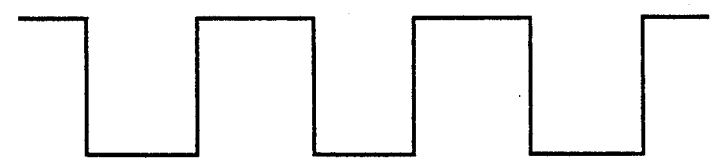
FIGS. 3A and 3B show signal waveforms for explaining a problem of a conventional IC card.
Figure 3B:
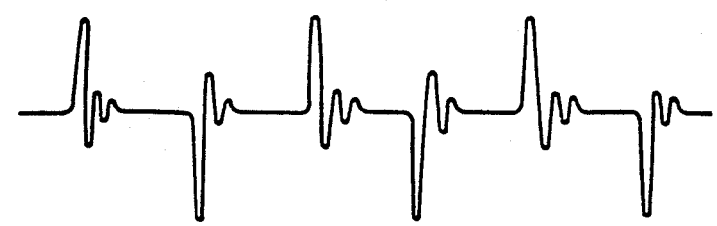

The leading and trailing edges of the waveform in FIG. 2C and the polarity of the output from magnetic read head 13 do not correspond to each other due to a winding direction of the coil. Accordingly, an output having the opposite polarity can be obtained.

FIG. 4 shows a second embodiment. In this embodiment, in addition to IC 10, I/O 15, low-pass filter 14, and transducer 12, which are the same as in the first embodiment, key pad 211 (FIG. 4) for entering predetermined key inputs to IC 10, and liquid crystal display 212 capable of performing predetermined display of output data from IC 10 are incorporated in IC card substrate 210, thereby constituting a so-called intelligent type IC card. Referring to FIG. 4, reference numeral 213 denotes a driver for liquid crystal display 212; and 214, a built-in battery such as a lithium paper battery serving as a drive source for each part described above.

FIG. 5 shows a circuit arrangement of the reading unit used for reading the IC card in FIGS. 1 or 4. This reading unit comprises amplifier 311 for amplifying an output from magnetic read head 13, integration circuit 312 for integrating an output from amplifier 311, and level detection circuit 313 for detecting an output from integration circuit 312 and outputting a digital output.

FIGS. 6A to 6D show waveforms at respective parts when the IC card in FIGS. 1 or 4 is read by the reading unit in FIG. 5. More specifically, FIG. 6A shows a waveform of an input current to transducer 12 after the current is pre-enhanced by low-pass filter 14 in the IC card. A broken line in FIG. 6A indicates an output data waveform (rectangular wave) from IC 10 prior to the preprocessing by means of low-pass filter 14. FIG. 6B shows an output waveform from magnetic read head 13 of the reading unit. Note that because of the effect of the pre-processing, this waveform does not include an overshoot portion which will constitute an undesired ringing component. FIGS. 6C and 6D respectively show output waveforms from integration and level detection circuits 312 and 313 of the reading unit. Since these waveform do not include an error component, subsequent digital data processing can be reliably performed. Note that all the above waveforms were actually detected when resistor R1 and capacitor C1 in low-pass filter 14 were respectively set at 900 Ω and 1 μF.

FIGS. 7A to 7D show waveforms at parts corresponding to FIGS. 6A to 6D when the conventional IC card is read without the pre-processing by means of low-pass filter 14. More specifically, an output waveform in FIG. 7B from magnetic read head 13 includes ringing components. As shown in FIGS. 7C and 7D, output waveforms from integration and level detection circuits 312 and 313 of the reading unit include error components. Therefore, if an input signal to transducer 12 is not pre-processed in the IC card, the subsequent digital data processing cannot be performed without an error, thereby degrading reliability.

As has been described in detail, according to the present invention, in an IC card comprising a card-like medium integrally incorporating an IC memory and the like in which data can be stored and from which it can be read out, and a transducer incorporated in the medium, having a winding for generating a magnetic field to obtain magnetic coupling with a magnetic read head of an external circuit, the medium incorporates a preprocessing circuit such as a low-pass filter for preprocessing a signal to be supplied to the transducer in such a manner that substantially its high-frequency components are attenuated.

With this arrangement, in the IC card, a preprocessing circuit such as a low-pass filter can pre-enhance a pulse to generate ramps at the leading and trailing edges of the pulse before it is supplied to the transducer, thereby attenuating its high-frequency components. As a result, high-frequency (ringing) components in the reading unit can be prevented.

Therefore, according to the present invention, there is provided an IC card which can allow a reading unit used together with a magnetic card to perform more reliable data read processing of the IC card.

What is claimed is:
1. An IC card comprising:
a card substrate;
an IC element incorporated in said card substrate, said IC element including at least a memory in which data can be stored and from which data can be read out;
pre-processing means, incorporated in said card substrate, for receiving an output from said IC element, said pre-processing means pre-enhancing readout data from said memory of said IC element, to substantially attenuate a high-frequency component; and
transducer means, incorporated in said card substrate, for receiving an output from said pre-processing means, said transducer means generating a magnetic field corresponding to the readout data supplied from said memory of said IC element via said pre-processing means.

2. An IC card according to claim 1, wherein said transducer means is magnetically coupled to an external magnetic read head.

3. An IC card according to claim 1, wherein said pre-processing means includes a low-pass filter.

4. An IC card according to claim 3, wherein said low-pass filter comprises an input terminal for receiving an output from said IC element, a resistor, one terminal of which is connected to said input terminal, a differential amplifier, first and second input terminals of which are respectively connected to the other terminal of said resistor and a reference potential point, a capacitor feedback-connected to said input terminal and an output terminal of said differential amplifier, and an output terminal for supplying an output from said differential amplifier to said transducer means.

5. An IC card according to claim 1, wherein said transducer means includes a thin film coil formed on said card substrate.

6. An IC card according to claim 5, herein said thin film coil in flatly wound around a thin film magnetic core formed on said card substrate.

7. An IC card according to claim 6, wherein said thin film magnetic core includes a gap, formed at a predetermined position thereof, for generating a magnetic field.

8. An IC card according to claim 1, wherein when readout data from said memory of said IC element is a rectangular wave signal, said pre-processing means generates ramps at leading and trailing edges of the rectangular wave signal.

9. An intelligent IC card comprising:
a card substrate;
an IC element incorporated in said card substrate, said IC element including a storage section in which data can be stored and from which data can be read out, an operation control section capable of operation and control of data, and an input/output section capable of inputting/outputting data;
pre-processing means, incorporated in said card substrate, for receiving an output from said IC element, said pre-processing means pre-enhancing output data from said storage section and/or said operation control section of said IC element, to substantially attenuate a high-frequency component;
transducer means, incorporated in said card substrate, for receiving an output from said pre-processing means, said transducer means generating a magnetic field corresponding to the output data supplied from said storage section and/or said operation control section of said IC element via said pre-processing means;
key pad means, incorporated in said card substrate, for supplying predetermined key inputs to said IC element; and
display means, incorporated in said card substrate, for receiving the output data from said storage section and/or said operation control section of said IC element and providing predetermined displays.

10. An IC card according to claim 9, wherein said transducer means is magnetically coupled to an external magnetic read head.

11. An IC card according to claim 1, wherein said pre-processing means includes a low-pass filter.

12. An IC card according to claim 11, wherein said low-pass filter comprises an input terminal for receiving an output from said IC element, a resistor, one terminal of which is connected to said input terminal, a differential amplifier, first and second input terminals of which are respectively connected to the other terminal of said resistor and a reference potential point, a capacitor feedback-connected to said output terminal and said first input terminal of said differential amplifier, and an output terminal for supplying an output from said differential amplifier to said transducer means.

13. An IC card according to claim 9, wherein said transducer means includes a thin film coil formed on said card substrate.

14. An IC card according to claim 13, wherein said thin film coil is flatly wound around a thin film magnetic core formed on said card substrate.

15. An IC card according to claim 14, wherein said thin film magnetic core includes a gap, formed at a predetermined position thereof, for generating a magnetic field.

16. An IC card according to claim 9, wherein when readout data from said memory of said IC element is a rectangular wave signal, said pre-processing means generates ramps at leading and trailing edges of the rectangular wave signal.

17. An IC card according to claim 9, further comprising driver means, incorporated in said card substrate, for supplying a drive output to said display means, in response to an output from said IC element.

18. An IC card according to claim 9, further comprising a built-in battery for applying a predetermined voltage to each part of said IC card.

19. An IC card according to claim 9, wherein said display means includes a liquid crystal display.

20. An IC card according to claim 9, wherein said key pad means includes numeral keys and predetermined operation designation keys.

* * * * *